United States Patent Office 3,242,112
Patented Mar. 22, 1966

3,242,112
CURABLE COMPOSITIONS COMPRISING A POLYMERIC BIS-CYCLOPENTADIENYL COMPOUND AND A POLY-UNSATURATED MATERIAL
Alfred Renner, Allschwil, and Franz Rudolf Widmer, Basel, Switzerland, assignors to Ciba Limited, Basel, Switzerland, a Swiss company
No Drawing. Filed Dec. 10, 1962, Ser. No. 243,610
Claims priority, application Switzerland, Dec. 12, 1961, 14,360/61
26 Claims. (Cl. 260—23.7)

The reaction of the bis(cyclopentadienyl) compound $\alpha:\alpha'$-bis(cyclopentadienyl)-para-xylene with N:N'-(1:3-phenylene)-bismaleimide is known. Even when this reaction is performed under very extreme conditions, namely by heating in an autoclave under nitrogen for 48 hours at 200° C., a brittle, insoluble product is obtained which has a softening point of 360° C.

The aforesaid known process is not suitable for the manufacture of curable resin mixtures that can be used, for example, as casting resins, laminating resins or adhesives.

It has now surprisingly been found that when a mixture containing dimeric or polymeric bis(cyclopentadienyl) compounds and unsaturated dienophilic compounds containing on an average more than 2 non-aromatic carbon-to-carbon double bonds or carbon-to-carbon triple bonds is heated under normal conditions, cured solid products are obtained that have very valuable technical properties. Such reactive mixtures are, therefore, suitable for a wide variety of uses, for example as casting resins, lacquers, molding compounds, laminating resins and adhesives.

Accordingly the present invention provides a process for the manufacture of cured resins, wherein
(1) Dimers or low polymers of bis(cyclopentadienyl) compounds of the general formula (I)

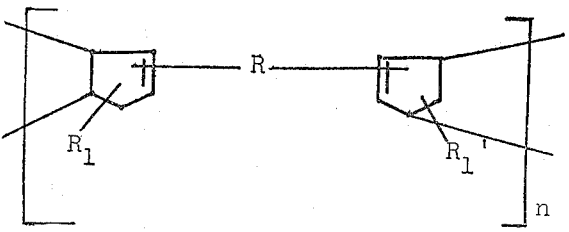

in which R stands for a divalent radical, more especially

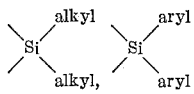

or a divalent aliphatic, cycloaliphatic, araliphatic or aromatic hydrocarbon which may be interrupted by oxygen atoms or substituted by hydroxyl groups or by halogen atoms, $n$ is a whole number from 2 to 20, and $R_1$ and $R_1'$ each represents a hydrogen atom or a methyl group, are reacted preferably at an elevated temperature with
(2) Unsaturated dienophilic compounds having a non-aromatic carbon-to-carbon double bond equivalency and/or carbon-to-carbon triple bond equivalency of which the sum is greater than 2.

As dimeric and polymeric bis(cyclopentadienyl) compounds of the Formula I there are suitable the following compounds in the form of their dimers or oligomers:

Bis(cyclopentadienyl)methane,
Bis(cyclopentadienyl)phenylmethane,
1:5-bis(cyclopentadienyl)pentane,
1:6-bis(cyclopentadienyl)hexane,
1:9-bis(cyclopentadienyl)nonane,
1:4-bis(cyclopentadienyl)butene-2,
1:4-bis(cyclopentadienyl)butine-2,
$\alpha:\alpha'$-bis(cyclopentadienyl)-para-xylene,
4:6-bis(cyclopentadienyl-methyl)-1:3-dimethylbenzene,
1:3-bis(cyclopentadienyl-methyl)-2:4:6-trimethyl-benzene,
2:2'-bis(cyclopentadienyl)diisopropyl ether,
Bis-[(cyclopentadienyl)-pentenyl]-ether,
1:4-bis(cyclopentadienyl)-cyclopentene-2,
2:2'-bis(cyclopentadienyl-methyl)-spiro-di-meta-dioxane,
Di-(cyclopentadienyl)dimethylsilane,
Bis(methyl-cyclopentadienyl)dimethylsilane, and
Di-(cyclopentadienyl)diphenylsilane.

The above-mentioned dimeric or polymeric bis(cyclopentadienyl) compounds are obtained by reacting alkali metal or Grignard compounds of cyclopentadiene or of methylcyclopentadiene with dihalogen compounds of the formula (II)                X—R—X in which R has the same meaning as in Formula I and X stands for a halogen atom, preferably chlorine or bromine and then heating the reaction mixture. When a metal compound of cyclopentadiene or methylcyclopentadiene is reacted, there are primarily formed the monomeric bis-cyclopentadienes of the formula (III)

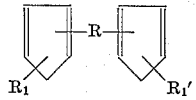

in which R, $R_1$ and $R_1'$ have the same meanings as in Formula I.

The monomers are very reactive and are converted, by way of a reaction that often takes place without any intervention, by polydiene addition with themselves into the oligomers or lower polymers. It is of advantage to accelerate this autoreaction by heating to, for example, 80 to 150° C. The oligomeric and low-polymeric products have the character of oils, of viscous liquids or fusible solid resins, depending primarily on the nature of the divalent radical R and on the degree of polymerization $n$. In general, the aforesaid products are soluble in suitable solvents, for example in aromatic hydrocarbons or halogen-alkanes. In many cases they constitute mixtures of polymers having different polymerization degrees $n$. The experimentally determined magnitude of $n$ then represents an average value so that it need not necessarily be a whole number. The values of $n$ as found most often range from 2 to 10. In the case of some structures, for example when R represents

—CH$_2$.CH=CH.CH$_2$— or

the value $n=2$ seems to appear most frequently.

When $n=2$, the experimentally determined molecular weight and the content of double bonds suggest dimers having a cyclic structure

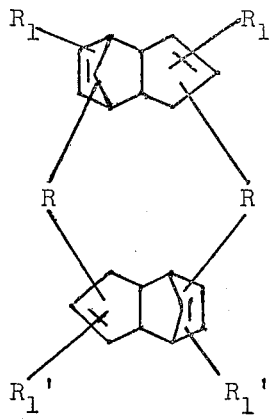

According to the present process bis-cyclopentadienes of the Formula I are reacted with unsaturated dienophilic compounds having a combined non-aromatic carbon-to-carbon double bond or triple bond equivalence greater than 2, that is to say compounds which contain together $y$ non-aromatic carbon-to-carbon double bonds or triple bonds calculated from the average molecular weight, $y$ being a whole or fractional number greater than 2.

When the aforesaid unsaturated dienophilic compounds (2) represent unitary chemical substances that can be defined by a structural formula, their molecules must contain at least 3 non-aromatic carbon-to-carbon double bonds and/or carbon-to-carbon triple bonds. In many cases of special practical importance—such as the unsaturated polyesters or the copolymers of butadiene—these products are known as mixtures of compounds of different molecular weights and a different content of double bonds, so that in each case the experimentally determined value of the double bond and triple bond equivalence is an average value. The double bond and/or triple bond equivalence of such unsaturated products need therefore not necessarily be a *whole* number greater than 2, but it must always be greater than 2.

As such unsaturated dienophilic compounds (2) having an olefinic double bond and/or triple bond equivalence greater than 2, there are especially suitable the following types of compounds:

(a) Unsaturated polyesters from unsaturated dicarboxylic or polycarboxylic acid with glycols or polyols, which may be modified with saturated dicarboxylic or polycarboxylic acids. As unsaturated polycarboxylic acids, from which such polyesters are derived, there may be mentioned: Maleic, fumaric, mesaconic, citraconic, itaconic, tetrahydrophthalic and aconitic acid.

As glycols or polyols, from which such unsaturated polyesters may be derived, there may be mentioned: Ethylene glycol, diethylene glycol, triethylene glycol, propylene glycol-1:2, propylene glycol-1:3, butanediol-1:4, 2-methylpentanediol-2:4, pentanediol-1:5, hexanediol-1:6; bis-β-hydroxyethyl ethers of bisphenol A (2:2'-bis[para-hydroxyphenyl]propane) or of tetrachloro-bisphenol A; glycerol, diglycerol, trimethylolethane, trimethylolpropane, butanetriol-(1:2:4); hexanetriol, pentaerythritol and pentachlorophenyl-glycerol ether.

As saturated dicarboxylic or polycarboxylic acids, which, if desired, may be concomitantly used to modify the unsaturated polyesters, there may be mentioned, for example: Oxalic, succinic, glutaric, adipic, pimelic, suberic, azelaic, sebacic, hexahydrophthalic, tricarballylic, phthalic, isophthalic, terephthalic, 2:6-naphthalene-dicarboxylic, diphenyl - ortho:ortho' - dicarboxylic acid, ethylene glycol-bis(para-carboxyphenyl)ether tetrachloro-phthalic, hexachloroendomethylene-tetrahydrophthalic and tetrachlorosuccinic acid.

(b) Unsaturated polyesters from unsaturated dihydric or polyhydric alcohols with unsaturated dicarboxylic or polycarboxylic acids which, if desired, may be modified by saturated dihydric or polyhydric alcohols and/or saturated dicarboxylic or polycarboxylic acids.

As unsaturated polyols from which such polyesters may be derived there may be mentioned:

1:6-bis(hydroxymethyl)-2:5-endomethylene-cyclohexene-3,
1:1-bis(hydroxymethyl)cyclohexene-3, and
1:1-bis(hydroxymethyl)-6-methyl-cyclohexene-3.

As unsaturated polycarboxylic acids and optionally also used saturated polycarboxylic acids and saturated polyalcohols there may be used for the synthesis of the unsaturated polyesters referred to under (b) above the compounds referred to under (a) above.

(c) Esters from monobasic unsaturated monocarboxylic acids, such as acrylic, methacrylic, crotonic, cinnamic, furfuracrylic, oleic, linoleic, ricinoleic or soybean fatty acid, with trihydric or polyhydric alcohols, such as glycerol, trimethylolpropane, pentaerythritol, hydroxyethylated or hydroxypropylated novolaks, polyglycerol ethers of polyhydric phenols. As examples the following compounds may be mentioned:

Glycerol-trisacrylate, glycerol-trisoleate and unsaturated natural vegetable and animal oils, such as linseed oil, tung oil or fish oils.

(d) Esters from unsaturated dicarboxylic or polycarboxylic acids, such as maleic, fumaric or itaconic acid, and unsaturated monohydric alcohols, such as allyl alcohol or crotyl alcohol. As examples there may be mentioned diallyl maleate and dicrotyl maleate.

(e) Ethers from unsaturated monohydric alcohols, such as allyl or crotyl alcohol, and compounds containing three or more hydroxyl groups, such as glycerol, pentaerythritol, methylolmelamines or cyanuric acid. As relevant examples there may be mentioned hexamethylolmelamine pentaallyl ether, a transetherification product, containing on an average more than 2 alloxyethyl groups per molecule, from hexamethylolmelamine hexamethyl ether and ethylene glycol monoallyl ether, or triallyl cyanurate.

(f) Polymers and copolymers of dienes, such as butadiene or isoprene, whose molecule contains on an average more than 2 carbon-to-carbon double bonds. Particularly suitable copolymers are those of butadiene or isoprene with ethylene, propylene, styrene, acrylonitrile or acrylic acid esters, such as ethyl acrylate or butyl acrylate. Typical representatives of this group of compounds are marketed, for example, under the registered trademark "Buton" resins.

(g) Compounds which are derived from carboxylic acids having a carbon-to-carbon triple bond, such as a propargylic or acetylenedicarboxylic acid, and which contain on an average a total of more than 2 carbon-to-carbon double bonds and triple bonds per molecule. Suitable examples are esters of acetylenedicarboxylic acid with monohydric unsaturated alcohols, for example diallyl-acetylenedicarboxylate, also esters of propargylic acid with at least trihydric alcohols, for example glycerol-tris-propargylate, and finally unsaturated polyesters derived from acetylenedicarboxylic acid and the diols or polyols listed under (a) above, or from other unsaturated and/or saturated dicarboxylic or polycarboxylic acids likewise listed under (a) above.

The curing reaction according to the invention taking place between the bis(cyclopentadienyl) compound of the Formula I and the unsaturated dienophilic compounds having a non-aromatic double bond or triple bond equivalence greater than 2 is advantageously performed at an elevated temperature, preferably at a temperature ranging from 150 to 200° C. This curing reaction is probably based on the following reaction mechanism: As is known, dicyclopentadiene is pyrolyzed to monomeric cyclopentadiene at a temperature above 150° C. With dienophilic compounds, for example maleic anhydride, on the other hand, monomeric cyclopentadiene reacts at such elevated temperatures with formation of the much more stable, so-called Diels-Alder adduct. Therefore, the curing reaction of the invention performed at an elevated temperature is probably accompanied by a depolymerization of the dimeric or polymeric bis(cyclopentadienyl) compound in the presence of the unsaturated dienophilic compound (2) with which the monomeric bifunctional scission products—which have been formed in situ and are very short-lived under the reaction conditions—immediately undergo a further reaction. Since the molecule of the unsaturated dienophilic compound contains on an average more than 2 double or triple bonds, the reaction leads to three dimensional cross-linking.

At room temperature the curable mixtures of the dimeric or low-polymeric bis(cyclopentadienyl)compound and the unsaturated dienophilic compound are at least sufficiently stable to enable their industrial use as casting resins, laminating resins, adhesives or the like. Whereas, for example, mixtures containing dimeric or trimeric paraxylylene-biscyclopentadiene have only a very limited pot life, those mixtures which contain dimeric 1:4-bis(cyclopentadienyl)-butene-2 are especially distinguished by an outstanding pot life and shelf life and can be stored almost indefinitely at room temperature.

The fact mentioned above is of considerable industrial importance because it makes it possible to manufacture storable, heat-curable one-component systems which may be used, for example, as casting resins, lacquers, laminating resins, moulding compounds or adhesives.

It is also possible to interrupt the reaction of the polymeric bis(cyclopentadienyl) compound with the unsaturated dienophilic compound, for example, by quenching the reaction mixture before the cross-linking is complete. In this manner it is possible to produce "prepolymers," similar to the so-called "B-stages" in the case of phenol-formaldehyde resins which can still be shaped and cured at an elevated temperature and are especially suitable for certain purposes, for example for the production of mouldings or laminates.

When suitable catalysts are used, for example metal driers such as cobalt naphthenate or cobalt octoate, while at the same time providing an atmosphere of oxygen, the curing may also be performed at room temperature. Such systems, which cure even when no external heat is supplied, may be used, for example as cold-curing or air-drying lacquers.

As a rule, cross-linked infusible products of any desired shape may be manufactured by means of various techniques to yield casting, foamed products, mouldings, surface coatings, laminates, glued objects and the like. In this method a curable mixture of the starting components (1) and (2) and optionally the concomitantly used catalyst is prepared, filled into casting or press moulds, or brushed on as coatings, or introduced into joints to be cemented or the like, and the mixture is then allowed to cure, advantageously while applying external heat. Instead of a mixture of the components (1) and (2) there may be used a curable precondensate of these two substances.

The term "curing" as used in this context signifies the conversion of the aforesaid starting components (1) and (2), or of their precondensates, into insoluble, infusible resins.

Accordingly, the present invention includes within its scope curable resin mixtures containing (1) A bis(cyclopentadienyl) compound of the Formula I, (2) An unsaturated dienophilic compound having a non-aromatic carbon-to-carbon double bond equivalence and/or carbon-to-carbon triple bond equivalence greater than 2; or a curable precondensate obtained from the components (1) and (2), and, if desired, (3) A catalyst, for example a metal drier.

As active diluents the curable mixtures of the invention may further contain unsaturated compounds containing 1 or 2 non-aromatic carbon-to-carbon double or triple bonds, such as styrene, diallyl phthalate or glycol-bis-methacrylate.

It is further possible to add to the curable mixtures of the invention curable resins, for example phenoplasts, polyacetals from polyalchohols and aldehydes, or epoxy resins, provided they are compatible with the aforesaid components (1) and (2) and can be cured under the curing conditions employed together with the said components.

There may further be added to the curable mixtures at any stage prior to the curing operation fillers, plasticisers, pigments, dyestuffs, mould lubricants, flame-inhibitors or the like. Suitable extenders and fillers are, for example, asphalt, bitumen, glass fibers, mica, quartz meal, cellulose, kaolin, colloidal silicon dioxide having a large specific surface ("Aerosil") or metal powders.

The curable mixtures of the invention may be used in the unfilled or filled state, if desired in the form of solutions or emulsions, as textile auxiliaries, laminating resins, moulding compounds, injection moulding compounds, paints, lacquers, dipping resins, casting resins, coating compositions, pore fillers, putties, adhesives or the like and also for the manufacture of such products. By virtue of their good film-forming properties and the outstanding adherence of the cured products on substrata, such as glass, porcelain, metals, wood, masonry and the like the curable mixtures of the invention are of special value for the protection of surfaces and as adhesives.

Parts and percentages in the following examples are by weight, and the relationship between part by weight and part by volume is the same as that between the kilogram and the liter.

The curing reactions described in the following examples were performed with the following bis(cyclopentadienyl) compounds I–XVI and the following unsaturated compounds (polyesters A to F and hexamethylolmelamine pentaallyl ether G):

(a) BIS(CYCLOPENTADIENYL) COMPOUNDS

I. *Polymeric 1:5-bis(cyclopentadienyl)pentane.*—110 parts of sodium metal are fused in 875 part of xylene, finely dispersed and then cooled. 20 parts of tertiary butyl alcohol and 1.5 parts of tertiary butyl catechol are added and while cooling externally 370 parts of monomeric cyclopentadiene are stirred in dropwise at 45° C. The batch is left to itself for 14 hours at 20° C. under nitrogen. At 50 to 55° C. 460 parts of 1:5-dibromopentane are added and the mixture is stirred for another 2 hours at 80° C. Titration of the bromine ions reveals that a quantitative conversion has occurred. The batch is cooled to room temperature, mixed with 80 parts of methanol and 1000 parts of water and neutralized with 30 parts of acetic acid, then thoroughly mixed, and the aqueous layer is separated and the xylene solution is dried over sodium sulfate and filtered. The xylene is distilled off under 15 mm. Hg pressure and the reaction product is kept under this pressure for 3 hours at 100° C.

Yield: 390 parts of polymeric 1:5-bis(cyclopentadienyl)-pentane (=97.5% of the theoretical yield) in the form of a light-brown resin which is just still liquid at room temperature.

|  | C, percent | H, percent | Molecular weight |
|---|---|---|---|
| Analysis: | | | |
| Calculated | 90.0 | 10.0 | |
| Found | 89.8 | 10.0 | 1,600 |

II. *Dimeric 1:4-bis(cyclopentadienyl)-butene - (2).*—While cooling externally a suspension of cyclopentadienyl sodium prepared as described above under I from 2080 parts of xylene, 276 parts of sodium, 35.5 parts of tertiary butanol, 0.5 part of phenyl-β-naphthylamine and 872 parts of cyclopentadiene, 712 parts of 1:4-dichloro-butene-(2) are stirred in at 30 to 35° C. The temperature is then raised and maintained for 3 hours at 105° C. Titration of the alkalinity reveals that a quantitative conversion has taken place. The batch is filtered at room temperature and the sodium chloride formed is washed with 5 x 400 parts of xylene. The xylene is evaporated under a pressure of 15 mm. Hg and the residue is kept for 1 hour at 100° C. 1 mm. Hg pressure.

Yield: 978 parts of dimeric 1:4-bis(cyclopentadienyl)-butene-(2) [=93.2% of the theoretical yield calculated from 1:4-dichlorobutene-(2)] in the form of a light-brown viscous oil.

|  | C, percent | H, percent | Molecular weight |
|---|---|---|---|
| Analysis: |  |  |  |
| Calculated | 91.25 | 8.75 | 368 |
| Found | 90.1 | 9.0 | 403 |

III. *Polymeric 4:6 - bis(cyclopentadienyl-methyl)-1:3-dimethylbenzene.*—While externally cooling a suspension of cyclopentadienyl sodium (prepared as described under I from 345 parts of xylene, 46 parts of sodium, 5.9 parts of tertiary butanol, 0.5 part of tertiary butylcatechol and 158 parts of cyclopentadiene) diluted with 100 parts of ethyleneglycol diethyl ether, a solution of 193 parts of 4:6-bis-(chloromethyl)-1:3-dimethylbenzene in 500 parts of xylene is stirred in at 50° C. The temperature is raised and maintained for 2 hours at 130° C. The sodium chloride formed is filtered off at room temperature and washed with xylene. The solvent is evaporated under 15 mm. Hg pressure and the residue is kept for 4 hours under same pressure at 90 to 100° C.

Yield: 199 parts of polymeric 4:6-bis-(cyclopentadienyl-methyl)-1:3-dimethylbenzene [=80% of the theoretical yield calculated from the initially used 4:6-bis-(chloromethyl)-1:3-dimethylbenzene], as a brown, brittle resin.

|  | C, percent | H, percent | Molecular weight |
|---|---|---|---|
| Analysis: |  |  |  |
| Calculated | 91.6 | 8.4 |  |
| Found | 89.1 | 8.3 | 1,148 |

IV. *Polymeric 1:3-bis(cyclopentadienyl-methyl)-2:4:6-trimethylbenzene.*—While externally cooling a suspension of cyclopentadienyl sodium (prepared as described under III), diluted with 100 parts of ethyleneglycol diethyl ether, a solution of 206 parts of 1:3-bis-(chloromethyl)-2:4:6-trimethylbenzene in 605 parts of xylene is stirred in at 35 to 40° C. The temperature is then slowly raised to 105° C. and kept at this level for 4 hours. The sodium chloride formed is filtered off at room temperature and washed with 3 x 173 parts of xylene. The filtrate is concentrated under 18 mm. Hg and finally kept for 1 hour at 90° C. under the same pressure. A quantitative yield is obtained of a light-brown, brittle resin having a softening point of 84° C. (on the Kofler hot bench).

|  | C, percent | H, percent | Molecular weight |
|---|---|---|---|
| Analysis: |  |  |  |
| Calculated for $(C_{21}H_{24})_x$ | 91.3 | 8.7 |  |
| Found | 89.1 | 8.6 | 756 |

V. *Mixture of isomers of polymeric bis(cyclopentadienyl-pentenyl)-ethers.*—While externally cooling a suspension of cyclopentadienyl sodium (prepared as described under I from 173 parts of xylene, 24.2 parts of sodium, 2.8 parts of tertiary butanol and 76 parts of cyclopentadiene), 103.5 parts of a mixture of isomers of bis(chloropentenyl)ethers [bis(5 - chloro - 3-pentenyl)ether+bis(3-chloro-4-pentenyl)ether] in 87 parts of xylene are stirred in at 30 to 33° C. The temperature is then maintained for 14 hours at 50° C. and then for 3 hours at 80° C. The sodium chloride formed is filtered off at room temperature and washed with 3 x 40 parts of xylene. The solvent is distilled off under a pressure of 18 mm. Hg and the residue is kept for 2 hours at 90° C. under 0.1 mm. Hg pressure. Yield: 101 parts of a brownish red oil.

The mixture of isomers of bis(chloropentenyl)ethers can be prepared, for example, by the process described in German specification No. 862,154 of January 8, 1953, to Rohm & Haas Company, Philadelphia, Pa. (V. St. A.), from 1 molar proportion of symmetrical dichlorodimethyl ether and 2 molar proportions of butadiene.

VI. *Dimeric 1:3 - bis(cyclopentadienyl)-propanol-2.*—As described under I a suspension of cyclopentadienyl sodium in xylene is prepared from 875 parts of xylene,
115 parts of sodium,
20 parts of tertiary butanol,
1.5 part of tertiary butylcatechol, and
363 parts of cyclopentadiene.

While cooling this suspension 231 parts of epichlorohydrin are stirred in at a rate such that the temperature of the reaction batch remains constant at 30° C. The batch is kept for 15 hours at room temperature and then mixed, while being cooled, with 247 parts of concentrated hydrochloric acid (of 37% strength). The aqueous phase is separated, washed with 250 parts of water, dried over sodium sulfate, filtered, and the solvent is evaporated in a falling-film evaporator at 150° C. under 15 mm. Hg pressure.

Yield: 248 parts of a dark-red substantially solid resin.

|  | Calculated for dimeric dicyclopentadienyl-propanol-(2) | Found |
|---|---|---|
| Molecular weight | 376 | 370 |
| Active hydrogen, percent | 0.53 | 0.52 |

VII. *Dimeric di - cyclopentadienyl-dimethylsilane.*—As described under I a suspension of cyclopentadienyl sodium is prepared from 875 parts of xylene,
115 parts of sodium,
20 parts of tertiary butanol,
1.5 parts of tertiary butylcatechol, and
363 parts of cyclopentadiene.

This suspension is reacted at 30 to 35° C. with 322.5 parts of dimethyldichlorosilane. The batch is allowed to react for another hour at 80° C., then washed, dried with sodium sulfate, the xylene is distilled off through a descending condenser and the residue is finally heated for 1 hour under 15 mm. Hg at 150° C. Yield: 353 parts (=75% of the theoretical) of dimeric dicyclopentadienyl-dimethylsilane as a medium viscous, yellowish brown liquid.

|  | Calculated | Found |
|---|---|---|
| Analysis: |  |  |
| Molecular weight | 376 | 390 |
| Silicon, percent | 14.9 | 14.3 |

VIII. *Dimeric di-(x-methylcyclopentadienyl)-dimethylsilane.*—The method used is that described under VII, except that the 363 parts of cyclopentadiene are replaced by 440 parts of methylcyclopentadiene (boiling at 70° C.) prepared by pyrolysis of commercial dimethyl-dicyclopentadiene. Yield: 258 parts of a light-yellow oil having a molecular weight of 366.

IX. *Oligomeric bis(cyclopentadienyl)methane.*—As described under I a suspension of cyclopentadienyl sodium in xylene is prepared from 1820 parts of xylene,
230 parts of sodium,
30 parts of tertiary butanol,
1 part of phenyl-β-naphthylamine, and
726 parts of monomeric cyclopentadiene.

The suspension is heated to 90° C. and, while heating the batch, 383 parts of methylene chloride are stirred in dropwise within 5 hours at 100–120° C., after which the mixture is heated for 3 hours at 110 to 120° C., then cooled to room temperature, neutralized with glacial acetic acid, the sodium chloride formed is filtered off and the filter cake is washed twice with xylene. The solvent is evaporated under vacuum, finally at 90° C. under 18 mm. Hg pressure. Yield: 465 parts (=72% of the theoretical) of trimeric bis(cyclopentadienyl)methane in the form of a light-brown, plastic resin.

| | C, percent | H, percent | Molecular weight $(C_{11}H_{12})_3$ |
|---|---|---|---|
| Analysis: | | | |
| Calculated | 91.6 | 8.4 | 432 |
| Found | 90.5 | 8.5 | 462 |

X. *Oligomeric 1:4 - bis(cyclopentadienyl)butine-(2).*—While externally cooling a suspension of cyclopentadienyl sodium (prepared as described under I from 175 parts of xylene, 23 parts of sodium, 3 parts of tertiary butanol, 0.05 part of phenyl-β-naphthylamine and 72.6 parts of monomeric cyclopentadiene) a mixture of 58.4 parts of 1:4-dichlorobutine-(2) in 20 parts of tetrahydrofuran is stirred in within 40 minutes at 30° C. The batch is then heated to 90° C. and kept at this temperature for 2 hours, then neutralized with acetic acid; the sodium chloride formed is filtered off, washed twice with xylene, and the solvent is distilled off from the filtrate under reduced pressure, finally for 1 hour at 80 to 100° C. under a pressure of 18 mm. Hg. Yield: 45 parts of polymeric 1:4-bis(cyclopentadienyl)-butine-(2) in the form of a brown, viscid liquid. Molecular weight: 257.

XI. *Oligomeric bis(cyclopentadienyl)phenylmethane.*—23 parts of sodium are fused in 87 parts of xylene, finely dispersed and cooled. 56 parts of xylene are decanted and replaced by 180 parts of tetrahydrofuran. 3 parts of tertiary butanol and 0.05 part of phenyl-β-naphthylamine are then added, the whole is heated to 60 to 75° C., and in the course of 35 minutes 76.5 parts of benzalchloride are stirred in dropwise. The reaction mixture is refluxed for 2 hours, cooled to room temperature, neutralized with glacial acetic acid, and the sodium chloride formed is filtered off. The filter cake is washed 3 times with xylene. The filtrate is evaporated under reduced pressure, finally for 2 hours at 95° C. under 18 mm. Hg pressure. Yield: 82.5 parts (=79% of the theoretical) of a brownish red, brittle resin which turns soft at 107° C. (on a Kofler hot bench). Molecular weight: 633.

XII. *Oligomeric 2:2'-bis(cyclopentadienyl)diisopropyl ether.*—This compound is prepared as described under XI from 54 parts of xylene, 46 parts of sodium, 5.9 parts of tertiary butanol, 145 parts of cyclopentadiene and 168 parts of 2:2'-dichloro-diisopropyl ether, the latter being added to the solution of cyclopentadienyl sodium at 40° C. After conventional processing 189 parts (=83.6% of the theoretical yield) of a reddish brown, thickly liquid oil are obtained. Molecular weight: 366.

XIII. *Polymeric 2:2'-bis(cyclopentadienyl-methyl)-spiro-bi-metadioxane.*—69 parts of sodium are fused in 250 parts of xylene, finely dispersed and cooled. By repeated decantation and addition of tetrahydrofuran the xylene is replaced by 400 parts of tetrahydrofuran. 15 parts of tertiary butanol are added and then, at 35° C., 218 parts of monomeric cyclopentadiene. The solution is stirred for 16 hours at room temperature. A solution of 257 parts of pentaerythritol-bis(chloracetaldehyde)acetal in 300 parts of tetrahydrofuran is added dropwise within 1 hour at 65 to 70° C., the temperature is maintained for 2 hours at 65° C., and the batch is then cooled. The sodium chloride formed is filtered off and washed with tetrahydrofuran. The filtrate is evaporated under reduced pressure, finally for 45 minutes at 70° C. under 0.8 mm. Hg pressure. Yield: 275 parts (=81.3% of the theoretical) of a light-brown, clear, solid resin. Softening point: 54° C. (on a Kofler hot bench).

XIV. *Dimeric di - cyclopentadienyl - diphenylsilane.*—While externally cooling a suspension of cyclopentadienyl sodium prepared as described under I from 2100 parts of xylene, 276 parts of sodium, 48 parts of tertiary butanol, 3.6 parts of tertiary butylcatechol and 871 parts of cyclopentadiene, 1518 parts of diphenyldichlorosilane are stirred in dropwise at 30° C., and the mixture is kept for another 3 hours at 30° C., then neutralized with glacial acetic acid; the sodium chloride formed is filtered off and washed with xylene. The solvent is evaporated under reduced pressure, finally for 30 minutes at 65° C. under 0.5 mm. Hg pressure. Yield: 1440 parts (=77% of the theoretical) of a light-brown, solid resin. Softening point: 66° C. (on a Kofler hot bench).

Molecular weight:
    Calculated for the dimer _____ 625
    Found for the dimer _____ 555

XV. *Oligomeric 1:4-bis(cyclopentadienyl)cyclopentene-(2).*—While externally cooling a solution of cyclopentadienyl sodium (prepared as described under XIII from 80 parts of xylene, 180 parts of tetrahydrofuran, 23 parts of sodium, 3 parts of tertiary butanol, 0.1 part of phenyl-β-naphthylamine and 72.6 parts of cyclopentadiene), 107 parts of 1:4-dibromocyclopentene-(2) are stirred in dropwise within 30 minutes at 30° C. The mixture is stirred for 16 hours at room temperature, then neutralized with glacial acetic acid, the sodium bromide formed is filtered off and washed with tetrahydrofuran. The filtrate is heated for 2 hours at 80° C., then concentrated under vacuum, finally for 1 hour at 40° C. under 0.1 mm. Hg pressure. Yield: 79 parts of a viscid, dark brown oil. Molecular weight: 643.

XVI. *Copolymer from 1:4-bis(cyclopentadienyl)-butene-(2) and 2:2'-bis(cyclopentadienyl)diethyl ether.*—The above copolymeric bis(cyclopentadienyl) compound is prepared in the same manner as the bis(cyclopentadienyl) compound XIII from 320 parts of xylene, 152 parts of sodium, 1200 parts of tetrahydrofuran, 30 parts of tertiary butanol, 0.3 part of phenyl-β-naphthylamine, 475 parts of cyclopentadiene, 214 parts of β-dichlorodiethyl ether and 187.5 parts of 1:4-dichlorobutene. The viscid resin has a molecular weight of 784.

(b) UNSATURATED COMPOUNDS

*Unsaturated polyester A.*—A mixture of 1245 parts of isophthalic acid,
22 parts of phthalic anhydride, and
1435 parts of 1:2-propylene glycol is esterified under nitrogen at 180 to 210° C., while distilling off the water of reaction, in an apparatus comprising a column and a descending condenser until the acid number is smaller than 5. 881 parts of maleic anhydride are then added and the batch is esterified at 200 to 220° C. until an acid number of 25 has been established. Yield: 3300 parts of a solid resin softening at 65° C. (on a Kofler hot bench); it displays a double bond equivalence of 2.74 per kg. and has an average molecular weight of 1930.

*Unsaturated polyester B.*—A mixture of 588 parts of maleic anhydride,
655 parts of neopentyl glycol (=2:2-dimethylpropane-diol-1:3), and
0.25 part of hydroquinone is esterified at 160 to 200° C. under nitrogen, and while distilling off the water of reaction, until an acid number of 35 has been reached. There are obtained 1136 parts of a resin which is still soft at room temperature; it displays a double bond equivalence of 5.8 per kg. and has an average molecular weight of 2260.

*Unsaturated polyester C.*—A mixture of 742 parts of hexachloroendomethylene-tetrahydrophthalic anhydride,
392 parts of maleic anhydride,
502 parts of 1:2-propylene glycol,
8.2 parts of para-toluenesulfonic acid,
0.5 part of hydroquinone, and
500 parts of toluene is esterified for 36 hours while removing the water of reaction azeotropically; a total of 100 parts of water is removed. After the toluene has been distilled off, there are obtained 1528 parts of polyester resin which displays a double bond equivalence of 2.62 per kg., contains 27.9% of chlorine and has an average molecular weight of 1940.

*Unsaturated polyester D.*—A mixture of 1160 parts of fumaric acid,
836 parts of 1:2-propylene glycol, and
1 part of hydroquinone is esterified for 9 hours at 148 to 226° C. under nitrogen in an apparatus comprising a column and a descending condenser, a total of 347 parts of water being removed. During the last 90 minutes of the esterification the reaction is performed under reduced pressure (100 to 18 mm. Hg). Yield: 1621 parts of a solid polyester resin displaying a double bond equivalence of 6.17 per kg., having an average molecular weight of 2800 and an acid number of 27.

*Unsaturated polyester E.*—A mixture of 91.2 parts of acetylenedicarboxylic acid, 223.3 parts of bis(2-hydroxyethyl)isophthalate, 3.14 parts of para-toluenesulfonic acid and 950 parts of benzene is subjected to an azeotropic distillation until water no longer separates. The solvent is evaporated under vacuum, finally for 3 hours at 100 to 125° C. under 0.1 mm. Hg pressure, to yield 215 parts of a solid resin. Softening point: 48° C. (on a Kofler hot bench). Acid number: 17.5.

*Unsaturated polyester F.*—A solution is prepared by heating a mixture of 129.1 parts of ethylene glycol,
339.5 parts of diethylene glycol,
156.9 parts of maleic anhydride,
355.5 parts of phthalic anhydride,
116.9 parts of adipic acid, and
0.1 part of hydroquinone.

The solution is heated under nitrogen to 200° C. and esterified for 3 hours under atmospheric pressure while separating the water formed. The batch is then further esterified under reduced pressure for 5 hours at the same temperature until the polyester has reached an acid number of 17. Yield: 989 parts of a viscous liquid, having a double bond equivalence of 1.62 kg. and an average molecular weight of 3010.

*Hexamethylolmelamine pentaallyl ether G.*—A mixture of 648 parts of hexamethylolmelamine, 2580 parts of allyl alcohol and about 237 parts of hydrochloric acid of approximately 36% strength is vigorously stirred for 1 hour at 25° C. in a flask, then neutralized with calcined sodium carbonate (about 235 parts) to brilliant yellow-orange red. The salt formed is then filtered off and washed with allyl alcohol. A mixture of allyl alcohol and water is then distilled off the clear filtrate under a pressure of about 400 mm. Hg. The batch is then totally dehydrated by being heated in an oilbath at an internal temperature of about 105° C. under diminished pressure. The turbid syrup is allowed to stand for a few hours and then filtered while cold, to yield 883 parts of a water-clear syrup consisting substantially of an allyl ether which contains about five allyl ether groups for every molecular proportion of melamine.

*Example 1*

Mixtures of casting resins are prepared by intimately mixing a bis(cyclopentadienyl) compound II, V or VI with an unsaturated polyester A, B, C or D and in two specimens additionally with still another unsaturated compound in one of the ratios shown in the following Table I at 100 to 140° C. and, if necessary, degassing the mixture. The casting resin specimens are cast in aluminum moulds (140 x 40 x 10 mm.) and cured in an air-drying oven under the curing conditions shown in Table I. The mechanical properties of the cured castings are likewise listed in Table I.

TABLE I

| Specimen No. | Polymeric bis (dicyclopentadienyl) compound | Parts | Unsaturated polyester | Parts | Additional unsaturated compound | Parts | Prelim. curing Hrs. | Prelim. curing °C. | Final curing Hrs. | Final curing °C. | Flexural strength, kg./mm.$^2$ | Impact strength, cm.kg./cm.$^2$ | Modulus of elasticity, cg./mm.$^2$ | Heat distortion point accdg. to Martens (DIN), °C. |
|---|---|---|---|---|---|---|---|---|---|---|---|---|---|---|
| 1 | II | 16.2 | A | 100 | | | 2 | 150 | 24 | 180 | 10.6 | 6.7 | 579 | 60 |
| 2 | II | 21.6 | A | 100 | | | 1 | 130 | 24 | 180 | 10.5 | 9.3 | 633 | 61 |
| 3 | II | 27.0 | A | 100 | | | 2 | 150 | 24 | 180 | 8.8 | 6.4 | 593 | 70 |
| 4 | II | 32.4 | A | 100 | | | 2 | 150 | 24 | 180 | 9.7 | 7.9 | 540 | 73 |
| 5 | II | 24.4 | D | 100 | | | 2 | 150 | 24 | 180 | 11.1 | 4.7 | 666 | 61 |
| 6 | II | 49 | D | 100 | | | 24 | 150 | 24 | 180 | 10.80 | 5.8 | 559 | 99 |
| 7a, 7b | II | 26.2 | A, D | 75, 25 | | | 3 | 150 | 24 | 180 | 9.5 | 6.8 | 564 | 68 |
| 8 | II | 31.3 | B | 100 | | | 2 | 150 | 5 | 180 | 5.2 | 8.8 | 589 | 62 |
| 9 [1] | II | 20.8 | C | 100 | | | 2 | 150 | 5 | 180 | 12.5 | 2.7 | 713 | 87 |
| 10 | V | 30 | A | 100 | | | 2 | 150 | 5 | 180 | 8.2 | 7.8 | 528 | 48 |
| 11 | VI | 47.2 | B | 100 | | | 2 | 150 | 5 | 180 | 6.6 | 5.2 | | 51 |
| 12 | II | 50 | A | 100 | Glycol bismethacrylate. | 27 | 2 | 150 | 5 | 180 | 8.9 | 9.4 | | 51 |
| 13 | II | 34 | A | 100 | Diallyl maleate. | 6 | 2 | 150 | 5 | 180 | 10.2 | 6.9 | | 55 |

[1] The cured specimen 9 is self-extinguishing (combustibility accdg. to VDE 0303=Stage I, burns for 2 seconds).

*Example 2*

100 parts each of unsaturated polyester A are mixed with the amounts shown in the following Table II of the polymeric bis(cyclopentadienyl) compounds II, III, IV, VII or VIII and diluted with chloroform (100 to 120 parts of chloroform for every 100 parts of dry substance). Glass fiber fabrics are impregnated with the solutions thus prepared and then dried in air for ½ to 1 hour. The fabrics are then further dried in an air-drying oven at an elevated temperature under the conditions listed in Table II. The fabric specimens are then cut up into squares (15 x 15 cm.), 12 to 20 such sheets are stacked and then cured to form a laminate in a heated press under the pressing conditions shown in Table II. The properties of the laminates are likewise shown in Table II.

*Example 3*

100 parts each of unsaturated polyester A, E or F are mixed with the amounts shown in the following Table III of the polymeric bis(cyclopentadienyl) compounds I, IV, V, VI, VII, VIII, X, XI, XIII, XIV or XV and three specimens are additionally mixed with the indicated amounts of still unsaturated compound, and each resulting mixture is diluted with chloroform to form adhesive cements having a solids content of 50%.

Aluminum sheets marketed under the registered trade name "Anticorodal B" (17 x 25 x 1.5 mm.; 10 mm. overlap) are brushed with the cements, allowed to dry in air, clamped and cured for 5 hours at 180° C. in an air-drying oven. The shear strength values of the bonded sandwiches found at room temperature are shown in Table III.

TABLE III

| Specimen No. | Polymeric bis(cyclopentadienyl) compound | Parts | Unsaturated polyester | Parts | Additional unsaturated compound | Parts | Shear strength, kg./mm.² |
|---|---|---|---|---|---|---|---|
| 1 | IV | 29 | A | 100 | | | 2.3 |
| 2 | VI | 25.7 | A | 100 | | | 1.26 |
| 3 | VII | 25.7 | A | 100 | | | 1.52 |
| 4 | VIII | 29.6 | A | 100 | | | 1.80 |
| 5 | I | 27.4 | A | 100 | | | 2.82 |
| 6 | I | 55 | A | 100 | Diallylmaleate | 18 | 3.38 |
| 7 | I | 55 | A | 100 | Glycolbis-methacrylate | 27 | 2.88 |
| 8 | I | 53 | A | 100 | | | 2.53 |
| 9 | X | 25 | A | 100 | | | 1.96 |
| 10 | XI | 30 | A | 100 | | | 1.97 |
| 11 | XII | 31.5 | A | 100 | | | 3.04 |
| 12 | V | 32 | A | 100 | | | 2.7 |
| 13 | XIII | 43 | E | 100 | | | 1.12 |
| 14 | XIII | 87 | E | 100 | Maleic acid dipropargyl ester | 35 | 0.90 |
| 15 | XIV | 25 | F | 100 | | | 1.0 |
| 16 | XV | 32 | A | 100 | | | 1.5 |

*Example 4*

Mixtures of one of the bis(cyclopentadienyl) compounds I, II, III, VII or VIII with the unsaturated polyester A or with a commercial linseed oil in the amounts shown in the following Table IV are diluted with chloroform to form lacquer solutions having a solids content of 25%. Two of the lacquer specimens mixed with linseed oil are catalysed with a solution of 1% strength of cobalt octoate in toluene. Aluminum sheets 0.4 mm. thick are brushed with the lacquer specimens thus prepared, allowed to dry in air for ½ hour and then cured in an air-drying oven under the conditions shown in Table IV. The prop-

TABLE II

| Specimen No. | Polymeric bis-(cyclopentadienyl) compound | Parts per 100 pts. of unsaturated polyester A | Conditions for drying the impregnated glass fabric in an air-drying oven | | Pressing conditions, Preliminary pressing | | |
|---|---|---|---|---|---|---|---|
| | | | Mins. | °C. | Mins. | °C. | Press., kg./cm.² |
| 1 | II | 21.6 | 30 | 100 | 60 | 160 | 15 |
| 2 | III | 36 | 30 | 100 | 60 | 160 | 35 |
| 3 | IV | 38 | 30 | 125 | 60 | 160 | 45 |
| 4 | VII | 25.8 | 30 | 100 | 60 | 160 | 15 |
| 5 | VII | 25.8 | 10 | 80 | 60 | 160 | 35 |
| 6 | VIII | 29.5 | 10 | 80 | 60 | 160 | 35 |

| Specimen No. | Pressing conditions, Final pressing | | | Properties of the laminates | | | | | |
|---|---|---|---|---|---|---|---|---|---|
| | Mins. | °C. | Press., kg./cm.² | Flexural strength | | | Impact strength, cm.kg./cm.² | Heat distortion point accdg. to Martens (DIN) in °C. | Water absorption after 1 hour at 100° C. in percent |
| | | | | Thickness of laminate, mm. | Dry, kg./mm.² | After 1 hour in water at 100° C., kg./mm.² | | | |
| 1 | 40 | 220 | 35 | 2.6 | 30.6 | 24.0 | 83.7 | 69 | 0.56 |
| 2 | 40 | 220 | 20 | 3.0 | 32.9 | 23.6 | 84.5 | 72 | 0.55 |
| 3 | 40 | 220 | 35 | 3.1 | 33.1 | 26.1 | 88.1 | 80 | 0.61 |
| 4 | 40 | 220 | 35 | 2.5 | 30.1 | 22.0 | 69.8 | 47 | 0.76 |
| 5 | 40 | 220 | 35 | 2.8 | 24.6 | 11.3 | 78.7 | 36 | 0.26 |
| 6 | 40 | 220 | 35 | 2.2 | 26.6 | 14.4 | 61.4 | 40 | 1.33 | erties of the cured lacquer films are likewise shown in Table IV.

TABLE IV

| Specimen No. | Polymeric bis(cyclo-pentadienyl) compound | | Unsaturated dienophilic compound | | Cobalt metal (as Co-octoate), parts | Curing in air drying cabinet | | Properties of the lacquer films | |
|---|---|---|---|---|---|---|---|---|---|
| | | | | | | Time, mins. | Temp., °C. | Stability towards acetone [1] | Adhesivity [2] |
| | | Parts | | Parts | | | | | |
| 1 | II | 21.6 | Polyester A | 100 | | 60 | 250 | 1 | Good. |
| 2 | III | 36 | ----do---- | 100 | | 60 | 250 | 1 | Do. |
| 3 | VII | 26 | ----do---- | 100 | | 60 | 250 | 1 | Do. |
| 4 | VIII | 29 | ----do---- | 100 | | 60 | 250 | 1 | Do. |
| 5 | I | 72 | Linseed oil | 100 | | 60 | 160 | 3 | Do. |
| 6 | I | 72 | ----do---- | 100 | 0.08 | 60 | 160 | 2 | Do. |
| 7 | II | 69 | ----do---- | 100 | | 60 | 160 | 1 | Do. |
| 8 | II | 69 | ----do---- | 100 | 0.08 | 60 | 160 | 2 | Do. |

[1] The lacquer surface is rubbed ten times to and fro with a swab of cottonwool impregnated with acetone, and the results observed are classified as follows:
1=Lacquer surface displays no visually noticeable damage.
2=Surface slightly turbid.
3=Surface strongly attacked.
4=Lacquer film detached.
[2] After having been folded twice (as a sheet of paper is folded in half and then again at right angles to the first fold) the lacquer film should still adhere to the metal sheet.

*Example 5*

Lacquer solutions are prepared by mixing the bis(cyclopentadienyl) compound II with a styrene-butadiene copolymer (marketed under the registered trade name "Buton 100," which is free from solvent, has an average molecular weight of 8,000 to 10,000 and an iodine number of about 300), and by dilution with benzene in the ratios shown in the following Table V. The lacquer solutions thus prepared are brushed on aluminum sheets and cured under the conditions shown in Table V. The properties of the cured lacquer films are likewise shown in Table V.

*Example 6*

Mixtures of a bis(cyclopentadienyl) compound I, XIII or XIV with the unsaturated polyester A or E or with hexamethylolmelamine pentaallyl ether G in the amounts shown in the following Table VI are diluted with the amounts of solvent shown in Table VI to form lacquer solutions. Aluminum sheets 0.4 mm. thick are brushed with the lacquer specimens thus prepared, allowed to dry in air for ½ hour and then cured in an air-drying oven under the conditions shown in Table VI. The properties of the cured lacquer films are likewise shown in Table VI.

TABLE VI

| Specimen No. | Polymeric bis (cyclopentadienyl) compound | | Unsaturated dienophilic compound | | Other additives | | Solvent xylene, parts | methyl-isobutyl ketone, parts | Curing in air drying cabinet | | Properties of the lacquer films | |
|---|---|---|---|---|---|---|---|---|---|---|---|---|
| | | | | | | | | | Time, mins. | Temp., °C. | Stability towards acetone [1] (see explanation to Table IV) | Adhesivity [2] |
| | | Parts | | Parts | | Parts | | | | | | |
| 1 | I | 52 | Hexamethyl-olmelamine-pentaallyl ether. | 100 | | | 75 | 25 | 60 | 150 | 1 | Very good. |
| 2 | XIII | 43.4 | Polyester E | 100 | | | 162 | 54 | 10 | 180 | 1 | Good. |
| 3 | XIII | 87 | ----do---- | 100 | "Buton 100"[3] | 35 | 250 | 82 | 10 | 180 | 1 | Very good. |
| 4 | XIV | 43 | Polyester A | 100 | | | 71 | 24 | 30 | 180 | 1 | Good. |
| 5 | XIV | 66 | Hexamethyl-olmelamine-pentaallyl ether. | 100 | | | 133 | 33 | 30 | 180 | 1 | Do. |

[1] See footnote 1 of Table IV.  [2] See footnote 2 of Table IV.  [3] See Example 5.

TABLE V

| Specimen No. | Parts of polymeric bis (cyclopentadienyl) compound II | Parts of "Buton 100" | Parts of benzene | Curing in air drying cabinet | | Properties of the lacquer films | |
|---|---|---|---|---|---|---|---|
| | | | | Time, mins. | Temp., °C. | Stability towards acetone [1] | Adhesivity [1] |
| 1 | 96 | 85 | 543 | 10 | 180 | 2–3 | Good. |
| 2 | 96 | 85 | 543 | 20 | 180 | 2 | Do. |
| 3 | 96 | 85 | 543 | 60 | 180 | 1 | Do. |
| 4 | 48 | 85 | 399 | 10 | 180 | 2 | Do. |
| 5 | 48 | 85 | 399 | 20 | 188 | 2 | Do. |
| 6 | 48 | 85 | 399 | 60 | 180 | 1 | Do. |

[1] See footnote 1 of Table IV.  [2] See footnote 2 of Table IV.

Example 7

A mixture of 912 parts of unsaturated polyester A dissolved in
304 parts of ethylene chloride,
171 parts of bis(cyclopentadienyl) compound II [dimeric 1:4-bis(cyclopentadienyl)-butene-2],
95 parts of tertiary butylperbenzoate of 50% strength in dibutyl phthalate,
50 parts of zinc stearate,
600 parts of kaolin,
150 parts of titanium dioxide, and
750 parts of glass fibers of 6 mm. length is kneaded in a Werner-Pfleiderer kneader for 20 minutes and then dried for 8 hours in a vacuum cabinet at 60° C. The dried material is ground in a cutting mill through a 5 mm. sieve to form a granulate which is then molded under a pressure of 200 kg./cm.$^2$ to form shaped products.

| Molding conditions | | Properties |
|---|---|---|
| Time, minutes | Temperature, °C. | |
| 6 | 165 | Flexural strength, 407 kg./cm.$^2$. |
| 6 | 165 | Impact strength, 5.5 cm. kg./cm.$^2$. |
| 6 | 165 | Notched bar impact strength, 6.4 cm. kg./cm.$^2$. |
| 6 | 165 | Heat distortion point accdg. to Martens (DIN), 45° C. |
| 3.25 | 165 | Glow strength (VDE), grade 3. |
| 3 | 165 | Dielectric loss factor tgδ (50 cycles at 1,000 volt; VDE), 0.022. |
| 3 | 165 | Dielectric constant ε (50 cycles at 1,000 volt; VDE), 6.4. |
| 3 | 165 | Specific resistance VDE, 7.3×10$^{13}$ ohm/cm. |
| 3 | 165 | Surface resistance VDE, 10$^{12}$ ohm/cm. |
| 3 | 165 165 | Breakdown voltage VDE Thickness of specimen: 2.05 mm. instantaneous value, 34.5 kilovolts; 2.09 mm. after 1 min., 32 kilovolts. |
| 3 | 165 | Tracking resistance VDE, stage T2, short circuit. |

Example 8

A mixture of 131.1 parts of unsaturated polyester A, dissolved in
42.7 parts of ethylene chloride,
39.5 parts of bis(cyclopentadienyl) compound XI [=oligomeric bis(cyclopentadienyl) phenylmethane] dissolved in
13.2 parts of ethylene chloride,
19 parts of tertiary butylperbenzoate of 50% strength in dibutyl phthalate,
10 parts of zinc stearate,
120 parts of kaolin,
30 parts of titanium dioxide, and
150 parts of glass fibers of 6 mm. length is kneaded in a Werner-Pfleiderer kneader for 20 minutes and then dried for 8 hours in a vacuum cabinet at 60° C. The dried material is converted into a granulate through a 5 mm. sieve in a cutting mill, and the granulate is moulded into shaped structures under a pressure of 200 kg./cm.$^2$.

| Molding conditions | | Properties |
|---|---|---|
| Time, minutes | Temperature, °C. | |
| 8 | 170 | Flexural strength, 662 kg./cm.$^2$. |
| 8 | 170 | Impact strength, 4.6 cm.kg./cm.$^2$. |
| 3 | 170 | Modulus of elasticity, 1,917 kg./mm.$^2$. |
| 3 | 170 | Absorption of cold water within 24 hours at 20° C., 0.17%. |
| 3 | 170 | Absorption of boiling water, 0.19%. |
| 3.5 | 170 | Dielectric loss factor tgδ (50 cycles at 1,000 volt; VDE), 0.0325. |
| 3.5 | 170 | Dielectric constant ε (50 cycles at 1,000 volt; VDE), 5.0. |
| 3.5 | 170 | Specific resistance VDE, 4.8×10$^{15}$ ohm/cm. |
| 3.5 | 170 | Surface resistance VDE, 10$^{12}$ ohm/cm. |
| 3.5 | 170 | Tracking resistance VDE, stage T5, for stoved depth of 0.1 mm. |

Example 9

A mixture of 138 parts of unsaturated polyester A, dissolved in
46 parts of ethylene chloride,
32.7 parts of copolymeric bis(cyclopentadienyl) compound XVI, dissolved in
11.0 parts of ethylene chloride,
19 parts of tertiary butylperbenzoate of 50% strength in dibutyl phthalate,
10 parts of zinc stearate,
120 parts of kaolin,
30 parts of titanium dioxide, and
150 parts of glass fibers of 6 mm. length is kneaded for 20 minutes in a Werner-Pfleiderer kneader and then dried for 8 hours in a vacuum cabinet at 60° C. The dried material in ground to form a granulate in a cutting mill through a 5 mm. sieve, and the granulate is moulded to form shaped products under a pressure of 200 kg./cm.$^2$.

| Molding conditions | | Properties |
|---|---|---|
| Time, minutes | Temperature, °C. | |
| 8 | 170 | Flexural strength, 680 kg./mc.$^2$. |
| 8 | 170 | Impact strength, 4.9 cm.kg./cm.$^2$. |
| 3 | 170 | Modulus of elasticity, 2,060 kg./mm.$^2$. |
| 3 | 170 | Absorption of cold water in 24 hours at 20° C., 0.15%. |
| 3 | 170 | Absorption of boiling water in 10 minutes, 0.18%. |
| 3.5 | 170 | Dielectric loss factor tgδ (50 cycles at 1,000 volt; VDE), 0.0425. |
| 3.5 | 170 | Dielectric constant ε (50 cycles at 1,000 volt; VDE), 4.4. |
| 3.5 | 170 | Specific resistance VDE, 3.2 × 10$^{15}$ ohm/cm. |
| 3.5 | 170 | Surface resistance VDE, 10$^{12}$ ohm/cm. |
| 3.5 | 170 | Tracking resistance VDE, stage T5, stoved depth 0.1 mm. |

Example 10

A mixture of 119.4 parts of unsaturated polyester A, dissolved in
39.8 parts of ethylene chloride,
51.6 parts of bis(cyclopentadienyl) compound XIII [=polymeric 2:2'-bis(cyclopentadienylmethyl)-spiro-bi-meta-dioxane] dissolved in
17.2 parts of ethylene chloride,
19 parts of tertiary butylperbenzoate of 50% strength in dibutyl phthalate,
10 parts of zinc stearate,
120 parts of kaolin, 30 parts of titanium dioxide, and
150 parts of glass fibers of 6 mm. length is kneaded for 20 minutes in a Werner-Pfleiderer kneader and then dried for 8 hours in a vacuum cabinet at 60° C. The dried material is converted into a granulate in a cutting mill through a 5 mm. sieve and then moulded to shaped products under a pressure of 200 kg. per cm.²

| Molding conditions | | Properties |
|---|---|---|
| Time, minutes | Temperature, °C. | |
| 8 | 170 | Flexural strength, 862 kg./cm.². |
| 8 | 170 | Impact strength, 7.2 cm.kg./cm.². |
| 3 | 170 | Modulus of elasticity, 1,966 kg./mm.². |
| 3 | 170 | Absorption of cold water in 24 hours at 20° C., 0.20%. |
| | 170 | Absorption of boiling water in 10 minutes, 0.23%. |
| 3.5 | 170 | Dielectric loss factor tgδ (50 cycles at 1,000 volt; VDE), 0.039. |
| 3.5 | 170 | Dielectric constant ε (50 cycles at 1,000 volt; VDE), 4.4. |
| 3.5 | 170 | Specific resistance, 2.8×10¹⁵ ohm/cm. |
| 3.5 | 170 | Surface resistance VDE, 10¹² ohm/cm. |
| 3.5 | 170 | Tracking resistance VDE, stage T5, stoved depth, 0.1 mm. |

What is claimed is:
1. A curable resin composition of matter, which comprises
   (1) an oligomeric bis(cyclopentadienyl) compound of the formula

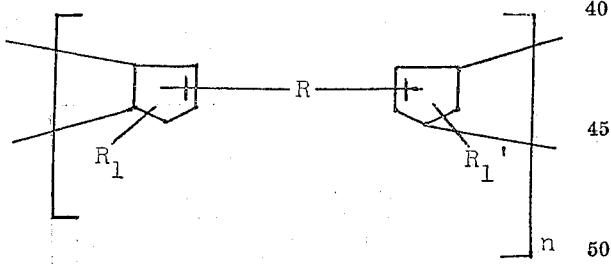

in which R is a member selected from the group consisting of

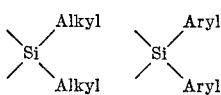

divalent aliphatic hydrocarbon radicals, divalent cycloaliphatic hydrocarbon radicals, divalent araliphatic hydrocarbon radicals, divalent aliphatic hydrocarbon radicals interrupted by oxygen bridges and hydroxy-substituted divalent aliphatic hydrocarbon radicals, $n$ is an integer of at least 2 and at the most 20, and $R_1$ and $R_1'$ each are members selected from the group consisting of hydrogen atom and the methyl group; and
   (2) an unsaturated dienophilic compound in which the total number of non-aromatic carbon-to-carbon double bonds and carbon-to-carbon triple bonds is greater than 2.

2. A curable resin composition of matter, which comprises
   (1) an oligomeric bis(cyclopentadienyl)compound of the formula

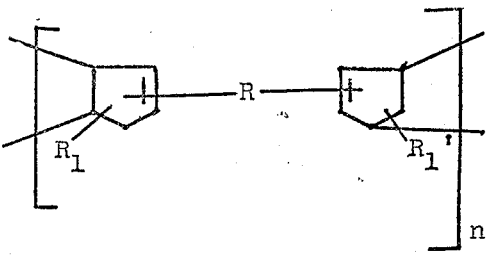

in which R is a member selected from the group consisting of

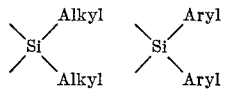

divalent aliphatic hydrocarbon radicals, divalent cycloaliphatic hydrocarbon radicals, divalent araliphatic hydrocarbon radicals, divalent aliphatic hydrocarbon radicals interrupted by oxygen bridges and hydroxy-substituted divalent aliphatic hydrocarbon radicals, $n$ is an integer of at least 2 and at the most 20, and $R_1$ and $R_1'$ each are members selected from the group consisting of hydrogen atom and the methyl group;
   (2) an unsaturated dienophilic compound in which the total number of non-aromatic carbon-to-carbon double bonds and carbon-to-carbon triple bonds is greater than 2,
   (3) as active diluent an unsaturated dienophilic compound in which the total number of non-aromatic carbon-to-carbon double bonds and carbon-to-carbon triple bonds is at least 1 and at the most 2.

3. A curable resin composition of matter, which comprises
   (1) an oligomeric bis(cyclopentadienyl) compound of the formula

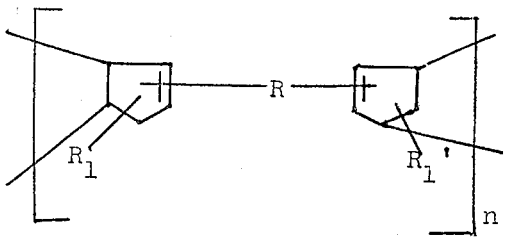

in which R is a member selected from the group consisting of

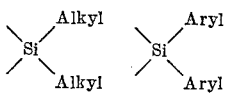

divalent aliphatic hydrocarbon radicals, divalent cycloaliphatic hydrocarbon radicals, divalent araliphatic hydrocarbon radicals, divalent aliphatic hydrocarbon radicals interrupted by oxygen bridges and hydroxy-substituted divalent aliphatic hydrocarbon radicals, $n$ is an integer of at least 2 and at the most 20, and $R_1$ and $R_1'$ each are members selected from the group consisting of hydrogen atom and the methyl group;

(2) an unsaturated dienophilic compound in which the total number of non-aromatic carbon-to-carbon double bonds and carbon-to-carbon triple bonds is greater than 2; and (3) as catalyst a metal drier.

4. A composition as claimed in claim 1, in which the oligomeric bis(cyclopentadienyl) compound (1) is dimeric 1:4-bis(cyclopentadienyl)-butene-2.

5. A composition as claimed in claim 1, in which the oligomeric bis(cyclopentadienyl) compound (1) is oligomeric 1:5-bis(cyclopentadienyl)-pentane.

6. A composition as claimed in claim 1, in which the oligomeric bis(cyclopentadienyl) compound (1) is oligomeric 4:6-bis(cyclopentadienyl-methyl) - 1:3 - dimethyl-benzene.

7. A composition as claimed in claim 1, in which the oligomeric bis(cyclopentadienyl) compound (1) is oligomeric 1:3-bis(cyclopentadienyl-methyl)-2:4:6-trimethyl-benzene.

8. A composition as claimed in claim 1, in which the oligomeric bis(cyclopentadienyl) compound (1) is dimeric 1:3-bis(cyclopentadienyl)-propanol-2.

9. A composition as claimed in claim 1, in which the oligomeric bis(cyclopentadienyl) compound (1) is dimeric di-cyclopentadienyl-dimethyl-silane.

10. A composition as claimed in claim 1, in which the oligomeric bis(cyclopentadienyl) compound (1) is dimeric di-(methylcyclopentadienyl)-dimethylsilane.

11. A composition as claimed in claim 1, in which the oligomeric bis(cyclopentadienyl) compound (1) is dimeric di-cyclopentadienyl-diphenyl-silane.

12. A composition as claimed in claim 1, in which the oligomeric bis(cyclopentadienyl) compound (1) is oligomeric bis(cyclopentadienyl)methane.

13. A composition as claimed in claim 1, in which the oligomeric bis(cyclopentadienyl) compound (1) is oligomeric bis(cyclopentadienyl)phenylmethane.

14. A composition as claimed in claim 1, in which the oligomeric bis(cyclopentadienyl) compound (1) is oligomeric 1:4-bis(cyclopentadienyl)-butine-2.

15. A composition as claimed in claim 1, in which the oligomeric bis(cyclopentadienyl) compound (1) is oligomeric 1:4-bis(cyclopentadienyl)cyclopentene-2.

16. A composition as claimed in claim 1, in which the oligomeric bis(cyclopentadienyl) compound (1) is oligomeric bis(cyclopentadienyl-pentenyl)-ether.

17. A composition as claimed in claim 1, in which the oligomeric bis(cyclopentadienyl) compound (1) is oligomeric 2:2'-bis(cyclopentadienyl)diisopropyl ether.

18. A composition as claimed in claim 1, in which the oligomeric bis(cyclopentadienyl) compound (1) is oligomeric 2:2'-bis(cyclopentadienyl)diethyl ether.

19. A composition as claimed in claim 1, in which the oligomeric bis(cyclopentadienyl) compound (1) is oligomeric 2:2'-bis(cyclopentadienyl-methyl)spiro-bi-metadioxane.

20. A curable resin composition of matter, which comprises (1) an oligomeric bis(cyclopentadienyl) compound of the formula

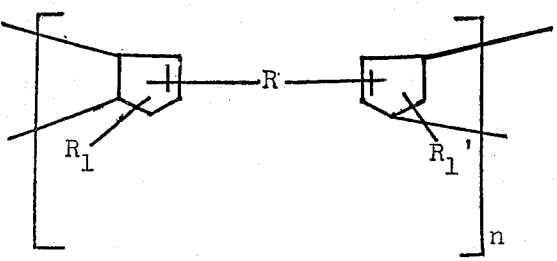

in which R is a member selected from the group consisting of

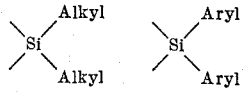

divalent aliphatic hydrocarbon radicals, divalent cycloaliphatic hydrocarbon radicals, divalent araliphatic hydrocarbon radicals, divalent aliphatic hydrocarbon radicals interrupted by oxygen bridges and hydroxy-substituted divalent aliphatic hydrocarbon radicals, $n$ is an integer of at least 2 and at the most 20, and $R_1$ and $R_1'$ each are members selected from the group consisting of hydrogen atom and the methyl group; and (2) an unsaturated dienophilic compound in which the total number of non-aromatic carbon-to-carbon double bonds is greater than 2.

21. A composition as claimed in claim 20, wherein the unsaturated dienophilic compound (2) is an unsaturated polyester.

22. A composition as claimed in claim 20, wherein the unsaturated dienophilic compound (2) is a polymer of a member selected from the group consisting of butadiene and isoprene.

23. A composition as claimed in claim 20, wherein the unsaturated dienophilic compound (2) is a copolymer of butadiene with a member selected from the group consisting of ethylene, propylene, styrene, acrylonitrile and acrylic acid esters.

24. A composition as claimed in claim 20, wherein the unsaturated dienophilic compound (2) is a copolymer of butadiene with styrene having an average molecular weight of about 8,000 to about 10,000.

25. A composition as claimed in claim 20, wherein the unsaturated dienophilic compound (2) is the triglyceride of an unsaturated fatty acid.

26. A composition as claimed in claim 20, wherein the unsaturated dienophilic compound (2) is hexamethylol-melamine-pentaallyl-ether.

No references cited.

DONALD E. CZAJA, *Primary Examiner.*

LEON J. BERCOVITZ, *Examiner.*